United States Patent
Te Kolste et al.

(10) Patent No.: US 7,064,899 B2
(45) Date of Patent: Jun. 20, 2006

(54) REDUCED LOSS DIFFRACTIVE STRUCTURE

(75) Inventors: Robert Te Kolste, Charlotte, NC (US); Michael R. Feldman, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 0 days.

(21) Appl. No.: 10/231,485

(22) Filed: Aug. 30, 2002

(65) Prior Publication Data

US 2004/0042081 A1    Mar. 4, 2004

(51) Int. Cl.
*G02B 5/18* (2006.01)

(52) U.S. Cl. ...................... 359/569; 359/576

(58) Field of Classification Search ............... 359/569, 359/558, 566, 576
See application file for complete search history.

(56) References Cited

U.S. PATENT DOCUMENTS

| | | | |
|---|---|---|---|
| 5,694,247 A | 12/1997 | Ophey et al. | 359/566 |
| 5,726,805 A | 3/1998 | Kaushik et al. | 359/589 |
| 6,191,890 B1 | 2/2001 | Baets et al. | 359/572 |
| 6,475,704 B1 * | 11/2002 | Iwasaki et al. | 430/321 |
| 6,562,523 B1 * | 5/2003 | Wu et al. | 430/5 |
| 6,650,477 B1 * | 11/2003 | Nakai | 359/569 |
| 2002/0015232 A1 | 2/2002 | Nakai | 359/569 |

OTHER PUBLICATIONS

F. Nikolajeff, B. Lofving, M. Johansson, J. Bengtsson, S. Hard, C. Heine, 'Fabrication and simulation of diffractive optical elements with superimposed antireflection subwavelength gratings', Appl. Opt., vol. 39, No. 26, Sep. 10, 2000, pp. 4842-4846.*

Y. Kanamori, M. Sasaki, K. Hane, 'Broadband antireflection gratings fabricated upon silicon substrates', Opt. Lett., vol. 24, No. 20, Oct. 15, 1999, pp. 1422-1424.*

Tyan, Rong-Chung et al. "Design, fabrication, and characterization of form-birefringent multilayer polarizing beam splitter". Journal of Optical Society of America, vol. 14, No. 7/Jul. 1997 pp. 1327-1636 US.

* cited by examiner

*Primary Examiner*—Thong Nguyen
*Assistant Examiner*—Arnel C. Lavarias
(74) *Attorney, Agent, or Firm*—Susan S. Morse

(57) ABSTRACT

A sub-wavelength anti-reflective diffractive structure is incorporated with a base diffractive structure having a small period to form a high efficiency diffractive structure. In the high efficiency diffractive structure, the anti-reflective structure and/or the base diffractive structure are altered from their ideal solo structure to provide both the desired performance and minimize reflections.

20 Claims, 3 Drawing Sheets

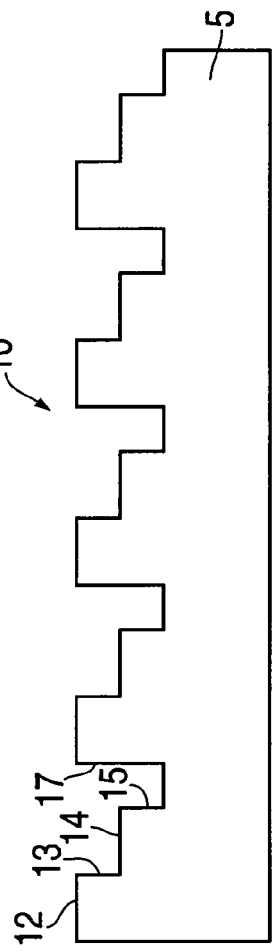
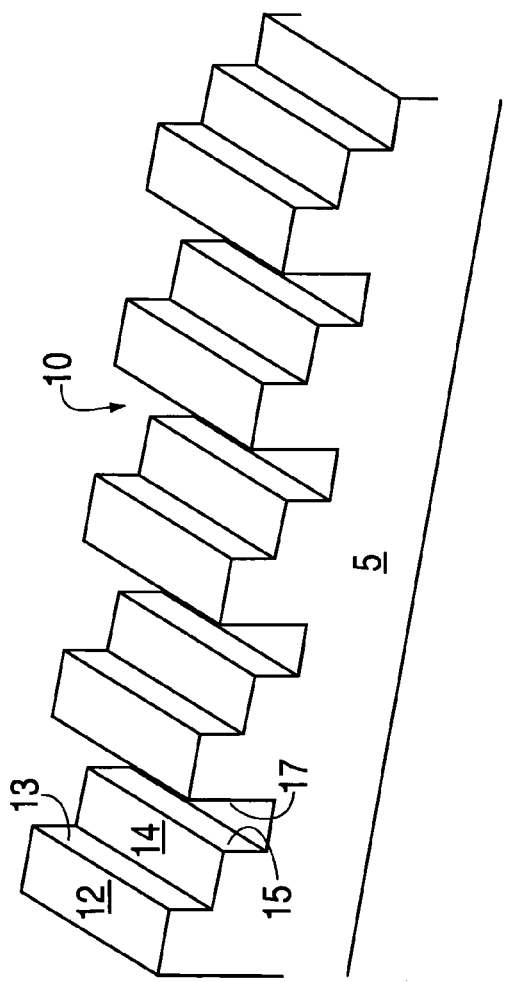

REDUCED LOSS DIFFRACTIVE STRUCTURE

BACKGROUND OF THE INVENTION

1. Field of the Invention

The present invention is directed to a high efficiency diffractive having reduced reflection losses.

2. Description of Related Art

The use of a diffractive to split off a portion of an input beam for monitoring of power, wavelength or for other purposes is known. Often the percentage of light to be split off is very small, e.g., a couple of percent of the input light. This is due to the fact that typically most of the light is to proceed on to the actual application, and as much power as possible is to be preserved in the application beam. For such low percentage splitters, the period of the diffractive structure usually needs to be very small to eliminate excess loss to other orders. In other words, the structure needs to be small enough such that all orders above the ±1 orders are excluded in both the reflective and transmissive mode. When a diffractive having such a very small period is coated with an anti-reflective (AR) coating to reduce reflection losses, the performance of the diffractive is often degraded. This degradation is typically due to the fact that the AR coating coats the walls of the diffractive as well as the planar surfaces thereof. For a small period structure, the AR coating is thick enough relative to the period of the structure that the AR coating degrades its performance.

SUMMARY OF THE INVENTION

The present invention is therefore directed to a high efficiency splitter having reduced reflection losses and associated methods which substantially overcomes one or more of the problems due to the limitations and disadvantages of the related art.

It is an object of the present invention to integrate a sub-wavelength anti-reflective diffractive structure with a base diffractive structure having a small period on the same surface to provide a high efficiency diffractive structure.

At least one of the above and other objects may be realized by providing diffractive structure including a base diffractive structure which provides a desired function at a design wavelength, the base diffractive structure being formed on a surface, the base diffractive structure having a period on the order of the design wavelength, and an anti-reflective diffractive structure integrated with and on the same surface as the base diffractive structure, the anti-reflective structure having a period that is smaller than the design wavelength.

The base diffractive structure may include a one-dimensional array of steps. The features of the anti-reflective diffractive structure may form a one dimensional array parallel to the one dimensional array of steps. The features of the anti-reflective diffractive structure may form a one dimensional array orthogonal to the one dimensional array of steps. The features of the anti-reflective diffractive structure may form a two dimensional array. The base diffractive structure and the anti-reflective structure may be created simultaneously on the surface. The anti-reflective structure may be created on the surface before the base diffractive structure is created on the surface. The base diffractive structure may be a splitter. The features of the base diffractive structure and features of the anti-reflective diffractive structure may be orthogonal to one another in an elongated dimension. The anti-reflective diffractive structure may be etched into the surface. The base diffractive structure and the anti-reflective diffractive structure may be etched into the surface. At least one of the base diffractive structure and the anti-reflective structure deviates from an optimal design for that structure alone.

At least one of the above and other objects may be realized by providing a diffractive structure including a base diffractive structure which provides a desired function at a design wavelength, the base diffractive structure being formed on a surface, and an anti-reflective diffractive structure integrated with and on the same surface as the base diffractive structure, the anti-reflective structure having a period that is smaller than the design wavelength, an etch depth of the anti-reflective structure being on an order of an etch depth of the base diffractive structure.

At least one of the above and other objects may be realized by providing a diffractive structure including a base diffractive structure which provides a desired function at a design wavelength, the base diffractive structure being formed on a surface, and an anti-reflective diffractive structure integrated with and on the same surface as the base diffractive structure, the anti-reflective structure having a period that is smaller than the design wavelength, wherein at least one of the base diffractive structure and the anti-reflective structure deviate from an optimal design for that structure alone.

At least one of the above and other objects may be realized by providing a method for creating a high efficiency diffractive structure including designing a base diffractive structure providing a desired function, designing an anti-reflective diffractive structure, combining designs for the base diffractive structure and the anti-reflective diffractive structure to form a combined design, optimizing the combined design for acceptable performance of the desired function and minimized reflection, the optimizing includes altering at least one of a depth of the base diffractive structure, a depth of the anti-reflective diffractive structure, and a period of the anti-reflective diffractive structure, to determine an optimized design, the optimized design deviating from the combined design, creating at least one mask in accordance with the optimized design, and patterning a resist from the at least one mask using a lithographic technique in accordance with the optimized design for each mask of the at least one mask to form the high efficiency diffractive structure.

The creating may include creating at least two masks, one of the at least two masks having information for only the base structure and another of the at least two masks having information for only the anti-reflective structure. The at least one mask has information for both the base structure and the anti-reflective structure.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 1A is a side view of a generic design of a base diffractive structure;

FIG. 1B is an elevational perspective view of the structure of FIG. 1A

DETAILED DESCRIPTION

Figure 2A:
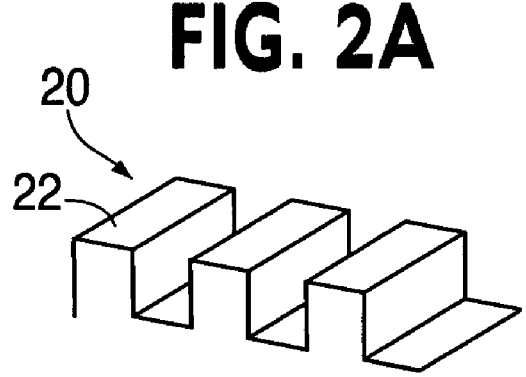
FIG. 2A is an elevational perspective view of a first embodiment of a sub-wavelength structure to be incorporated with the base diffractive structure of FIGS. 1A–1B.

The present invention will be described in detail through embodiments with reference to accompanying drawings. However, the present invention is not limited to the following embodiments but may be implemented in various types. The preferred embodiments are only provided to make the disclosure of the invention complete and make one having an ordinary skill in the art know the scope of the invention. The thicknesses of various layers and regions are emphasized for clarity in accompanying drawings. Also, when a layer is defined to exist on another layer or a substrate, the layer may exist directly on another layer or substrate, or an interlayer layer may be present therebetween. Throughout the drawings, the same reference numerals denote the same elements.

FIG. 1A is a side view of a base diffractive structure splitter 10, here a splitter for creating two beams. The splitter 10 has a plurality of steps 12, 14 in a substrate 5. Each step 12, 14 has a height and a width, which are determined in accordance with a desired performance and function at a design wavelength. Each step also has attendant side walls 13, 15, 17, which can be seen more clearly in FIG. 1B, which is a perspective top view of the splitter 10. As can be seen from these views, if a coating were provided on this structure 10, the coating would also coat the side walls 13, 15, 17 of the structure 10, as well as the planar surfaces of the structure. The features of this diffractive are so small that the linewidth of them is on the order of the thickness of a typical anti-reflective (AR) coating. In other words, the AR coating has a thickness which is a substantial percentage, e.g., 10% or greater, of the feature size. Thus, providing an AR coating on such structures degrades performance of the diffractive.

In accordance with the present invention, rather than using a coating, anti-reflective sub-wavelength diffractive structures are integrated with a base diffractive structure. The base diffractive structure provides the desired function and performance, while the anti-reflective diffractive structures reduce reflections from the base diffractive structure. These diffractive structures are on the same surface and form a single composite diffractive structure. These diffractive structures may be integrated by creating the anti-reflective diffractive structure on the surface at some stage during the base diffractive structure creation or by incorporating the design of the anti-reflective diffractive structures with that of the base diffractive structure and creating them simultaneously. These structures may be created lithographically in known manners. Either the anti-reflective structure or both diffractive structures may be etched into the substrate.

The base diffractive structure may have a period $\Lambda_{sp}$ on the order of the design wavelength, e.g., $\lambda < \Lambda_{sp} < 10\lambda$, often $2\lambda/n_1$, where $\lambda$ is the wavelength of interest and $n_1$ is the refractive index for the medium into which the light is transmitted. This period is small enough to eliminate excess loss in the higher orders, i.e., above the ±1 orders. The period is determined by the desired angles to be output from the splitter. The depth of the base diffractive structure is small, i.e., consistent with most of the light being transmitted into the zero$^{th}$ order. The AR structure may have a period $\Lambda_{AR}$ that is less than $\lambda/\max(n_0,n_1)$, where $n_0$ is the refractive index of the medium in which the light is traveling. An ideal AR structure would provide an effective refractive index at the interface of approximately $\sqrt{n_0 n_1}$. The depth of the AR structure is of the same order as that of the base diffractive structure. Since the base diffractive structure and the AR structure are of similar feature size, a mere additive combination of these structures would not result in an optimized high efficiency diffractive structure. Therefore, the ideal base diffractive structure and the ideal AR structure are first combined. The resultant structure is then modeled in a known fashion. Then at least one of the depth of the base diffractive structure, the depth of the AR structure, and the period of the AR structure, or any combination thereof, is altered until an optimized high efficiency diffractive structure is realized, i.e., a structure that provides both acceptable desired performance and minimizes reflections. In this manner, the base diffractive portion may be altered in order to improve performance due to the presence of the AR portion.

A mask or set of masks is then created in accordance with this optimized design and used to lithographically create the high efficiency diffractive structure. The mask(s) set the period for the structure. The depths of either structure may be altered to meet the optimized design by changing the exposure times and/or parameters of the resist being exposed. Depending on the particular optimized structure, one or more of the masks may have information regarding both the diffractive structure and the AR structure, or each mask may only contain information about one of the diffractive structure and the AR structure. The same lithographic equipment may be used for transferring the pattern for each mask into resist on a substrate. The pattern in the resist may then be transferred into the substrate. A plurality of high efficiency structures may be created on the wafer level and then singulated. Examples of different sub-wavelength AR structures are discussed below.

A first embodiment of a diffractive sub-wavelength AR structure 20 is shown in FIG. 2A. The AR structure 20 includes sub-wavelength steps 22 that run in the same direction as the steps 12, 14 of the base splitter structure 10. Due to the fact that these features are in the same direction, they may interfere with the desired functioning of the splitter 10, due to possible layer-to-layer misalignment. The effect of any such misalignment may be minimized by selecting the period of the AR structure such that the period of the base diffractive structure is not an integer multiple of the period of the AR structure.

Figure 2B:
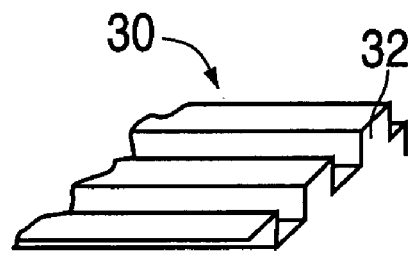
FIG. 2B is an elevational perspective view of a second embodiment of a sub-wavelength structure to be incorporated with the base diffractive structure of FIGS. 1A–1B.

A second embodiment of a diffractive sub-wavelength AR structure 30 is shown in FIG. 2B. Here, the AR structure 30 includes sub-wavelength steps 32 that run transverse to the steps 12, 14 of the base splitter structure 10. Because the steps 32 are transverse, alignment should not be as much of a concern. However, the attendant depth modulation introduced by creating the AR diffractive structure 30 before the splitter 10 may complicate the manufacturing process. The design of the AR diffractive structure 30 may be incorporated with the design of the splitter 10 so that they are created simultaneously.

Figure 2C:
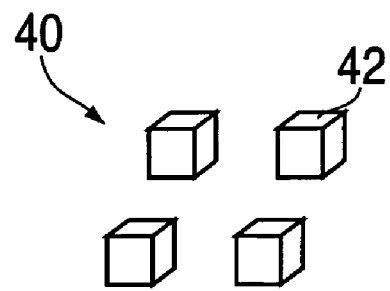
FIG. 2C is an elevational perspective view of a third embodiment of a sub-wavelength structure to be incorporated with the base diffractive structure of FIGS. 1A–1B.

A third embodiment of an AR diffractive sub-wavelength structure 40 is shown in FIG. 2C. Here, the AR diffractive structure 40 includes sub-wavelength steps 42 that do not extend continuously as the previous steps, but form a discrete two-dimensional array. Since the feature sizes of this embodiment are smaller than the other embodiments, these features may be harder to create. Alignment issues may also present a problem. However, these steps are less polarization sensitive than lines, which may be birefringent.

Figure 3:
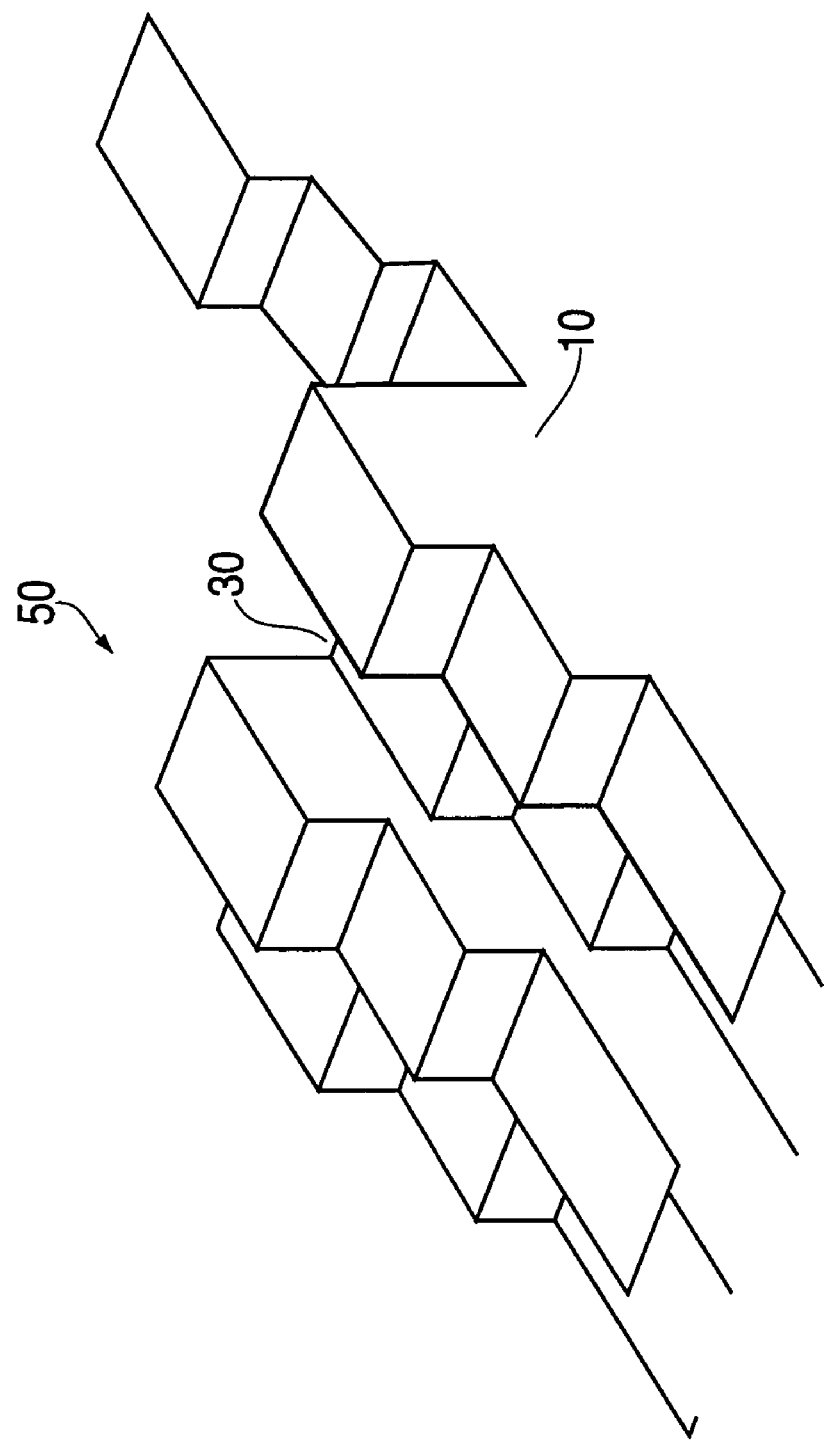
FIG. 3 is an elevational perspective view of a sub-wavelength structure of the present invention incorporated with a base diffractive structure.

FIG. 3 illustrates the splitter 10 of FIGS. 1A–1B with a transverse AR diffractive sub-wavelength structure 30 of FIG. 2B incorporated therein to form a reduced loss, high efficiency splitter 50. As can be seen by comparing the structure 50 in FIG. 3 with the structure 10 in FIGS. 1A–1B, the incorporation of the AR sub-wavelength structure 30 reduces the height of the splitter structure at certain intervals.

In accordance with the present invention, by providing sub-wavelength diffractive structures to serve as anti-reflection features, reflection losses may be reduced in a small period diffractive structure without incurring the attendant problems with coating the small period diffractive structure.

Although preferred embodiments of the present invention have been described in detail herein above, it should be clearly understood that many variations and/or modifications of the basic inventive concepts taught herein, which may appear to those skilled in the art, will still fall within the spirit and scope of the present invention as defined in the appended claims and their equivalents.

What is claimed is:

1. A diffractive structure, comprising:
   a base diffractive structure which provides a desired function at a design wavelength, the base diffractive structure having a period on the order of the design wavelength;
   an anti-reflective diffractive structure having a period that is smaller than the design wavelength, wherein a depth of the anti-reflective structure is on an order of a depth of the base diffractive structure;
   a combined diffractive structure formed by adding the base diffractive structure and the anti-reflective structure together;
   an optimized diffractive structure formed by varying at least one of the depth and the duty cycle of the combined diffractive structure to jointly optimize the desired function and the anti-reflection; and
   a surface on which the optimized diffractive structure is formed.

2. The diffractive structure of as claimed in claim 1, wherein the base diffractive structure includes a one-dimensional array of steps.

3. The diffractive structure as claimed in claim 2, wherein the features of the anti-reflective diffractive structure form a one dimensional array parallel to the one dimensional array of steps.

4. The diffractive structure as claimed in claim 2, wherein the features of the anti-reflective diffractive structure form a one dimensional array orthogonal to the one dimensional array of steps.

5. The diffractive structure as claimed in claim 1, wherein the features of the anti-reflective diffractive structure form a two dimensional array.

6. The diffractive structure as claimed in claim 1, wherein the base diffractive structure and the anti-reflective structure are created simultaneously on the surface.

7. The diffractive structure as claimed in claim 1, wherein the anti-reflective structure is created on the surface before the base diffractive structure is created on the surface.

8. The diffractive structure as claimed in claim 1, wherein the base diffractive structure is a splitter.

9. The diffractive structure as claimed in claim 1, wherein features of the base diffractive structure and features of the anti-reflective diffractive structure are orthogonal to one another in an elongated dimension.

10. The diffractive structure as claimed in claim 1, wherein the anti-reflective diffractive structure is etched into the surface.

11. The diffractive structure as claimed in claim 1, wherein the base diffractive structure and the anti-reflective diffractive structure are etched into the surface.

12. The diffractive structure as claimed in claim 1, wherein at least one of the base diffractive structure and the anti-reflective structure deviate from an optimal design for that structure alone.

13. A diffractive structure, comprising:
    a base diffractive structure which provides a desired function at a design wavelength;
    an anti-reflective diffractive structure having a period that is smaller than the design wavelength, wherein a depth of the anti-reflective structure is on an order of a depth of the base diffractive structure;
    an integrated diffractive structure formed by deviating at least one of the base diffractive structure and the anti-reflective structure from an optimal design for that structure alone; and
    a surface on which the integrated diffractive structure is formed.

14. The diffractive structure of as claimed in claim 13, wherein the base diffractive structure includes a one-dimensional array of steps.

15. The diffractive structure as claimed in claim 14, wherein the features of the anti-reflective diffractive structure form a one dimensional aray parallel to the one dimensional array of steps.

16. The diffractive structure as claimed in claim 13, wherein the features of the anti-reflective diffractive structure form a two dimensional array.

17. The diffractive structure as claimed in claim 13, wherein the base diffractive structure and the anti-reflective structure are created simultaneously on the surface.

18. The diffractive structure as claimed in claim 13, wherein the anti-reflective structure is created on the surface before the base diffractive structure is created on the surface.

19. The diffractive structure as claimed in claim 13, wherein features of the base diffractive structure and features of the anti-reflective diffractive structure are orthogonal to one another in an elongated dimension.

20. The diffractive structure as claimed in claim 13, wherein at least one of the base diffractive structure and the anti-reflective structure are etched into the surface.

* * * * *